(12) United States Patent
Yachi et al.

(10) Patent No.: US 11,387,458 B2
(45) Date of Patent: Jul. 12, 2022

(54) CARBON FIBER AGGREGATE AND METHOD FOR MANUFACTURING SAME, ELECTRODE MIXTURE LAYER FOR NON-AQUEOUS-ELECTROLYTE SECONDARY CELL, ELECTRODE FOR NON-AQUEOUS-ELECTROLYTE SECONDARY CELL, AND NON-AQUEOUS-ELECTROLYTE SECONDARY CELL

(71) Applicant: TEIJIN LIMITED, Osaka (JP)

(72) Inventors: Kazuki Yachi, Osaka (JP); Asami Kanematsu, Osaka (JP); Shinya Komura, Osaka (JP); Takahiro Daido, Osaka (JP)

(73) Assignee: TEIJIN LIMITED, Osaka (JP)

( * ) Notice: Subject to any disclaimer, the term of this patent is extended or adjusted under 35 U.S.C. 154(b) by 805 days.

(21) Appl. No.: 16/074,216

(22) PCT Filed: Feb. 3, 2017

(86) PCT No.: PCT/JP2017/003981
§ 371 (c)(1),
(2) Date: Jul. 31, 2018

(87) PCT Pub. No.: WO2017/135406
PCT Pub. Date: Aug. 10, 2017

(65) Prior Publication Data
US 2021/0143427 A1 May 13, 2021

(30) Foreign Application Priority Data

Feb. 5, 2016 (JP) .............................. JP2016-020381
Feb. 5, 2016 (JP) .............................. JP2016-020382

(51) Int. Cl.
*H01M 4/62* (2006.01)
*D01F 9/145* (2006.01)
*H01M 10/0525* (2010.01)

(52) U.S. Cl.
CPC ............ *H01M 4/625* (2013.01); *D01F 9/145* (2013.01); *H01M 10/0525* (2013.01)

(58) Field of Classification Search
CPC .................................................... H01M 4/626
See application file for complete search history.

(56) References Cited

U.S. PATENT DOCUMENTS

| | | | |
|---|---|---|---|
| 7,479,351 B2 * | 1/2009 | Matsubara | H01M 4/1395 429/218.1 |
| 2003/0049443 A1 | 3/2003 | Nishimura et al. | |
| 2007/0134151 A1 | 6/2007 | Jo et al. | |
| 2011/0033705 A1 | 2/2011 | Komura et al. | |
| 2017/0098822 A1 | 4/2017 | Yachi et al. | |

FOREIGN PATENT DOCUMENTS

| | | |
|---|---|---|
| EP | 1191131 A1 | 3/2002 |
| JP | 2005-097792 A | 4/2005 |
| JP | 2005097792 * | 4/2005 |
| JP | 2005-273037 A | 10/2005 |
| JP | 2012-188790 A | 10/2012 |
| WO | 2015/147234 A1 | 10/2015 |

OTHER PUBLICATIONS

International Search Report of PCT/JP2017/003981 dated Apr. 4, 2017.

* cited by examiner

*Primary Examiner* — Ula C Ruddock
*Assistant Examiner* — Thomas H. Parsons
(74) *Attorney, Agent, or Firm* — Sughrue Mion, PLLC

(57) ABSTRACT

The present invention provides a carbon fiber aggregate that is characterized by comprising carbon fibers in which crystallite interplanar spacing (d002) measured using X-ray diffraction is 0.3400 nm or more, the average fiber diameter being 10-900 nm, and the powder volume resistivity being $4.00 \times 10^{-2}$ Ω·cm or less when the packing density is 0.8 g/cm$^3$.

10 Claims, No Drawings

CARBON FIBER AGGREGATE AND METHOD FOR MANUFACTURING SAME, ELECTRODE MIXTURE LAYER FOR NON-AQUEOUS-ELECTROLYTE SECONDARY CELL, ELECTRODE FOR NON-AQUEOUS-ELECTROLYTE SECONDARY CELL, AND NON-AQUEOUS-ELECTROLYTE SECONDARY CELL

CROSS REFERENCE TO RELATED APPLICATIONS

This application is a National Stage of International Application No. PCT/JP2017/003981 filed Feb. 3, 2017, claiming priority based on Japanese Patent Application No. 2016-020381 filed Feb. 5, 2016 and Japanese Patent Application No. 2016-020382 filed Feb. 5, 2016.

TECHNICAL FIELD

The present invention relates to a carbon fiber aggregate and a production method therefor, an electrode mixture layer for a nonaqueous electrolyte secondary battery, which uses the carbon fiber, an electrode for a nonaqueous electrolyte secondary battery, with the electrode mixture layer formed, and a nonaqueous electrolyte secondary battery configured to include the electrode.

BACKGROUND ART

Carbon nanomaterials, in particular, ultrafine carbon fibers of 1 μm or less in average fiber diameter are, because of their excellent properties such as high crystallinity, high conductivity, high strength, high elastic modulus, and light weight, used as nanofillers of high-performance composite materials. The use applications thereof are not limited to reinforcing nanofillers for the purpose of improving mechanical strength, but through the utilization of the high conductivity of the carbon materials, the materials have been considered for use as additive materials for electrodes of various batteries and capacitors, electromagnetic shielding materials, or conductive nanofillers for antistatic materials, or as nanofillers blended in electrostatic paints for resins. In addition, through the utilization of the characteristics of chemical stability, thermal stability, and microstructure as carbon materials, the carbon materials are also expected to be used as field electron emission materials for flat displays and the like.

For example, Patent Literature 1 discloses the application of, as a carbon-based conducting aid, ultrafine carbon fibers of 10 μm or more in average effective length to an electrode mixture layer which has a relatively large thickness of 50 μm or more in film thickness. Because of the large average effective length of 10 μm or more, the fibers are advantageous in that long-distance conductive paths can be formed in the electrode mixture layer, but fired substantially at 3000° C. for enhancing the crystallinity, thereby increasing the production cost although the conductivity is improved.

Patent Literature 2 discloses a carbon fiber from polyacrylonitrile as a raw material, which has a fiber diameter and an aspect ratio specified (aspect ratio of 10 to 100), and thus favorable conductivity even with low crystallinity. In order to achieve electrode volume resistivity comparable to that of highly crystalline carbon fibers, it is necessary to keep the carbonization temperature as high as 2400° C., and inexpensive production is difficult. In addition, this carbon fiber is obtained by an electrospinning method, and not considered excellent in productivity.

CITATION LIST

Patent Literatures

Patent Literature 1: WO 2015/147234 A1
Patent Literature 2: JP 2012-188790 A.

SUMMARY OF INVENTION

Technical Problem

An object of the present invention is to provide a low-cost and high-conductivity carbon fiber aggregate and a method for producing the carbon fiber aggregate. Furthermore, another object of the invention is to provide an electrode mixture layer for a nonaqueous electrolyte battery, which is formed with the use of the carbon fiber aggregate, an electrode with the electrode mixture layer formed, and a nonaqueous electrolyte secondary battery configured with the use of the electrode.

Solution to Problem

The inventors have found out, as a result of earnest studies in view of the prior art mentioned above, that a carbon fiber aggregate capable of forming a long-distance conductive path even in an electrode mixture layer which is relatively large in thickness can be obtained by removing a resin from a resin composite fiber prepared under a predetermined condition, and then firing by heating at a relatively low temperature, and then achieved the present invention.

More specifically, the present invention is as follows.

[1] A carbon fiber aggregate characterized in that the carbon fiber aggregate includes a carbon fiber of 0.3400 nm or more in crystallite spacing (d002) in accordance with an X-ray diffraction method, and has an average fiber diameter of 10 to 900 nm, and the powder volume resistivity at a packing density of 0.8 g/cm$^3$ is 4.00×10$^{-2}$ Ω·cm or less.

A first aspect of the present invention is a carbon fiber aggregate characterized in that the carbon fiber aggregate includes a carbon fiber of 0.3400 nm or more in crystallite spacing (d002) in accordance with an X-ray diffraction method, and has an average fiber diameter of 10 to 900 nm, and the powder volume resistivity at a packing density of 0.8 g/cm$^3$ is 4.00×10$^{-2}$ Ω·cm or less. More specifically, because the carbon fiber constituting the foregoing carbon fiber aggregate is fired at a relatively low temperature, the crystallite spacing (d002) in accordance with the X-ray diffraction method is 0.3400 nm or more. This carbon fiber aggregate is unlikely to be broken in spite of the ultrafine fiber of 10 to 900 nm in average fiber diameter, and the powder volume resistivity at a packing density of 0.8 g/cm$^3$ can be thus achieved to be 4.00×10$^{-2}$ Ω·cm or less. The first aspect of the present invention is preferably provided with the following configuration.

[2] The carbon fiber aggregate according to [1], where the carbon fiber aggregate is 20 μm or more in average effective fiber length.

Because the carbon fiber constituting the foregoing carbon fiber aggregate is fired at a relatively low temperature, the fiber is unlikely to be broken, with a large effective fiber length.

[3] The carbon fiber aggregate according to [1], where the variation coefficient of the effective fiber length is 35% or higher and 90% or lower.

In this carbon fiber aggregate, a carbon fiber which is large in effective length and a carbon fiber which is small in effective length are mixed in definite proportions. In the electrode mixture layer, the carbon fiber which is small in effective length keeps the carbon fiber which is large in effective length from being oriented in the in-plane direction. Therefore, it is easy to orient the carbon fibers in the thickness direction of the electrode mixture layer.

[4] The carbon fiber aggregate according to [1], where the average aspect ratio is 80 or more and 10000 or less.

Because the carbon fiber constituting the foregoing carbon fiber aggregate is fired at a relatively low temperature, the fiber is unlikely to be broken, with an elongated fiber shape.

[5] The carbon fiber aggregate according to [1], where the average effective fiber length (A) and the average fiber length (B) satisfy the following formula (1):

$$0.500 < A/B < 0.900 \qquad \text{Mathematical Formula (1)}$$

In the carbon fiber aggregate, the average effective fiber length (A) is smaller as compared with the average fiber length (B). More specifically, because the carbon fiber is not completely linear, but curved, the carbon fiber is kept from being oriented in the in-plane direction in the electrode mixture layer. Therefore, it is easy to orient the carbon fibers in the thickness direction of the electrode mixture layer. It is to be noted that the definition of the effective fiber length will be described later.

[6] The carbon fiber aggregate according to [1], where the compression recovery degree represented by the following formula (2):

$$\text{Compression Recovery Degree (\%)} = \text{Volume Resistivity at Recovery/Volume Resistivity at Compression} \times 100 \qquad \text{Mathematical Formula (2)}$$

is 50% or higher and 90% or lower.

The carbon fiber constituting the foregoing carbon fiber aggregate is unlikely to be broken during compression.

[7] A method for producing the carbon fiber aggregate according to any of [1] to [6], the method comprising:

(1) a fiberizing step of forming a composition composed of 100 parts by mass of a thermoplastic resin and 1 to 150 parts by mass of a mesophase pitch in a molten state, thereby fiberizing the mesophase pitch to obtain a resin composite fiber;

(2) a stabilizing step of stabilizing the resin composite fiber to obtain a resin composite stabilized fiber;

(3) a thermoplastic resin removing step of removing the thermoplastic resin from the resin composite stabilized fiber to obtain a stabilized fiber; and (4) a heating and firing step of heating the stabilized fiber at 1,000° C. or higher and lower than 2400° C. under an inert atmosphere to obtain a carbon fiber.

This method for producing the carbon fiber aggregate is a method for producing a carbon fiber aggregate by a resin composite fiber and firing at a relatively low temperature.

[8] An electrode mixture layer for a nonaqueous electrolyte secondary battery, which includes:

the carbon fiber aggregate according to any one of [1] to [6]; and an electrode active material.

A second aspect of the present invention is an electrode mixture layer for a nonaqueous electrolyte secondary battery, which includes the carbon fiber aggregate according to any one of [1] to [6], and an electrode active material. In this electrode mixture layer, a long-distance conductive path is formed by the carbon fiber.

[9] An electrode for a nonaqueous electrolyte secondary battery, which includes:

a current collector; and the electrode mixture layer for a nonaqueous electrolyte secondary battery according to [8], stacked on the current collector.

A third aspect of the present invention is an electrode in which the electrode mixture layer for a nonaqueous electrolyte secondary battery according to [8] is formed on the surface of a current collector.

[10] A nonaqueous electrolyte secondary battery including the electrode mixture layer for a nonaqueous electrolyte secondary battery according to [8].

A fourth aspect of the present invention is a nonaqueous electrolyte secondary battery where a positive electrode and/or a negative electrode includes the electrode mixture layer for a nonaqueous electrolyte secondary battery according to [8].

Advantageous Effects of Invention

The carbon fiber constituting the carbon fiber aggregate according to the present invention has crystallite spacing (d002) in the predetermined range in the X-ray diffraction method. Therefore, the carbon fiber is unlikely to be broken in the manufacture of the electrode mixture layer, or the like, thereby maintaining a large effective fiber length. Therefore, long-distance conductive paths can be formed in the electrode mixture layer.

Furthermore, the carbon fiber aggregate according to the present invention is kept from being oriented in the in-plane direction of the electrode mixture layer due to the shape and distribution of the aggregate. Therefore, long-distance conductive paths can be efficiently formed in the electrode mixture layer in the thickness direction thereof. Therefore, the carbon fiber aggregate according to the present invention has promise as a battery material for forming an electrode with a large thickness.

The carbon fiber constituting the carbon fiber aggregate according to the present invention can be produced at low cost because the firing temperature is relatively low.

DESCRIPTION OF EMBODIMENTS

Hereinafter, the present invention be described in detail. It is to be noted that in the present invention, the average effective fiber length, the average fiber length, and the average fiber diameter each refer to a volumetric average value measured with the use of a particle size distribution meter for image analysis, unless otherwise specified.

1. Carbon Fiber Aggregate for Nonaqueous Electrolyte Secondary Battery 1-1. Properties of Carbon Fiber Aggregate The first aspect of the present invention is a carbon fiber aggregate for a nonaqueous electrolyte secondary battery (hereinafter, also referred to simply as a "carbon fiber aggregate"). The carbon fiber aggregate according to the present invention (hereinafter, also referred to as the "present carbon fiber aggregate") is characterized in that the carbon fiber aggregate includes carbon fibers of 0.3400 nm or more in crystallite spacing (d002) in accordance with an X-ray diffraction method, and has an average fiber diameter of 10 to 900 nm, and the powder volume resistivity at a packing density of 0.8 g/cm$^3$ is $4.00 \times 10^{-2}$ $\Omega \cdot$cm or less.

The carbon fiber constituting the present carbon fiber aggregate has a distance (d002) between adjacent graphite sheets, measured by wide-angle X-ray measurement, of 0.3400 nm or more, preferably 0.3410 nm or more, and more preferably 0.3420 nm or more. In addition, d002 is preferably 0.3450 nm or less, and more preferably 0.3445 nm or less. When d002 is less than 0.3400 nm, the carbon fiber is less likely to become brittle. Therefore, at the time of processing such as disintegration and preparation of kneaded slurry, the fiber is less likely to be broken, and fiber length is thus maintained. As a result, the formation of long-distance conductive paths is facilitated.

The carbon fiber constituting the present carbon fiber aggregate preferably has a crystallite size (Lc002) measured by wide angle X-ray measurement, of 50 nm or less, and more preferably 30 nm or less. The larger the crystallite size (Lc002), the higher the crystallinity, and the better the conductivity. However, when the crystallite size (Lc002) is small, the carbon fiber is less likely to become brittle. Therefore, at the time of processing such as disintegration and preparation of kneaded slurry, the fiber is less likely to be broken, and fiber length is thus maintained. As a result, the formation of long-distance conductive paths is facilitated.

The average fiber diameter of the present carbon fiber aggregate is 10 to 900 nm. The upper limit is preferably 600 nm or less, more preferably 500 nm or less, further preferably 400 nm or less, and still more preferably 300 nm or less. The lower limit is preferably 50 nm or more, more preferably 100 nm or more, further preferably 150 nm or more, and particularly preferably 200 nm or more.

Carbon fiber aggregates of less than 10 nm in average fiber diameter are very low in bulk density, and inferior in handling ability. In addition, when an electrode mixture layer is configured, there is a tendency to decrease the electrode strength. Carbon fiber aggregates in excess of 900 nm in average fiber diameter are made likely to have gaps produced between fibers in electrode mixture layers, and it may be difficult to increase the electrode density in some cases.

The variation coefficient (CV value) of the fiber diameter of the present carbon fiber aggregate is preferably 60% or lower, and more preferably 50% or lower. When the variation coefficient of the fiber diameter exceeds 60% excessively, there is a possibility that the degree of progress for infusibilization will vary in a flameproof treatment step, which is a part of the process of carbon fiber production, thereby making the structures of the carbon fibers nonuniform. In addition, there is a possibility that the fiber length will vary excessively in a grinding treatment step, which is a part of the process of carbon fiber production.

The present carbon fiber aggregate has high conductivity in a state of low packing density. Carbon fiber aggregates with high conductivity in a state of low packing density can impart conductivity at lower addition concentrations. Specifically, the powder volume resistivity of packing at a packing density of 0.8 g/cm$^3$ is preferably $4.00 \times 10^{-2}$ Ω·cm or less, and more preferably $3.00 \times 10^{-2}$ Ω cm or less. If the resistivity exceeds $4.00 \times 10^{-2}$ Ω·cm, the addition amount of the carbon fiber aggregate required for improving conductivity will be increased, which is not preferable. The lower limit is not particularly limited, but typically approximately 0.0001 Ω·cm. Specifically, the powder volume resistivity of packing at a packing density of 0.5 g/cm$^3$ is preferably 0.10 Ω·cm or less, and more preferably 0.08 Ω cm or less. If the resistivity exceeds 0.10 Ω·cm, the addition amount of the carbon fiber aggregate required for improving conductivity will be increased, which is not preferable. The lower limit is not particularly limited, but typically approximately 0.0001 Ω·cm.

The average effective fiber length of the present carbon fiber aggregate is preferably 20 μm or more, more preferably 30 μm or more, further preferably 40 μm or more, and particularly preferably 50 μm or more. In addition, the average effective fiber length is preferably 200 μm or less, more preferably 100 μm or less, further preferably 90 μm or less, and particularly preferably 80 μm or less. When an electrode mixture layer is produced with the use of a carbon fiber aggregate of less than 20 μm in average effective fiber length, conductive paths are more likely to be insufficiently formed in the electrode mixture layer, and the resistance value in the film thickness direction of the electrode mixture layer may be insufficiently lowered in some cases. When an electrode mixture layer is produced with the use of the carbon fiber aggregate with an average effective fiber length in excess of 200 μm, the carbon fibers are made more likely to be oriented in the in-plane direction in the electrode mixture layer. As a result, it may be difficult to form conductive paths in the film thickness direction in some cases.

In the present invention, the effective fiber length of the carbon fiber is defined as the length of the longest line segment with both ends in contact with a single carbon fiber. In other words, the length refers to the maximum straight-line distance for which a single carbon fiber can conduct electricity. More specifically, when a carbon fiber has a perfect linear structure, the effective length is substantially equal to the fiber length. When a carbon fiber has a branched structure, or is curled up, the length refers to the length of the largest line segment connecting two points on the single carbon fiber.

The variation coefficient (CV value) of the effective fiber length in the present carbon fiber aggregate is preferably 20% or higher, more preferably 30% or higher, still more preferably 35% or higher, and particularly preferably 40% higher. In addition, the variation coefficient is preferably 90% or lower, and more preferably 85% or lower. When the variation coefficient of the effective fiber length is 20% or higher and 90% or lower, carbon fibers that are large in effective fiber length coexist with short carbon fibers. Therefore, long-distance conductive paths can be efficiently formed in the electrode mixture layer by carbon fibers which are large in effective fiber length, and it is possible to enhance the action of keeping carbon fibers which are large in effective fiber length from being oriented in the in-plane direction by carbon fibers which are small in effective fiber length.

The present carbon fiber aggregate includes many carbon fibers that are large in effective fiber length, because the variation coefficient of the effective fiber length falls within a predetermined range as mentioned above. For example, in the carbon fiber aggregate according to Example 1 as described later, the number of carbon fibers that have a CV value of 80% and an effective length equal to or larger than the average effective fiber length (68 μm) accounts for 37% on the basis of the number of fibers, as a percentage of the number of fibers in the whole carbon fiber aggregate. The percentage of carbon fibers of 100 μm or more in effective fiber length is 19% of the whole carbon fiber aggregate on the basis of the number of fibers.

In the present carbon fiber aggregate, an average effective fiber length (A) and an average fiber length (B) preferably satisfy the following formula (1):

$$0.500 < A/B < 0.900 \qquad \text{Mathematical Formula (1).}$$

The lower limit of A/B is more preferably 0.550, further preferably 0.600, and particularly preferably 0.650. The upper limit of A/B is more preferably 0.850, further preferably 0.800, and particularly preferably 0.750.

In the carbon fiber aggregate, the average effective fiber length (A) is smaller as compared with the average fiber length (B). More specifically, the carbon fibers are not completely linear, but curved. The carbon fibers which have such a shape are kept from being oriented in the in-plane direction in the electrode mixture layer. More specifically, the carbon fibers make contact with each other, and have curved shapes, and the carbon fibers are thus randomly dispersed without being oriented in a certain direction. Therefore, the carbon fibers are also oriented in sufficient amounts in the thickness direction of the electrode mixture layer. As a result, a urge number of long-distance conductive paths can be formed in the thickness direction of the electrode mixture layer.

The carbon fiber aggregate which has such a shape can be produced by a resin composite fiber produced under predetermined conditions and firing at a predetermined temperature in the process of carbon fiber production.

The average aspect ratio of the present carbon fiber aggregate, that is, the ratio (L/D) of the average effective fiber length (L) to the average fiber diameter (D) is preferably 80 or more, more preferably 100 or more, and particularly preferably 200 or more. With the average aspect ratio to 80 or more, when an electrode mixture layer is produced with the use of the present carbon fiber aggregate, conductive paths made by carbon fibers are efficiently formed in the electrode mixture layer. As a result, cycle characteristics of a battery can be improved which is manufactured to include the electrode mixture layer. In the case of an average aspect ratio of less than 80, when an electrode mixture layer is produced with the use of the carbon fiber aggregate, conductive paths made by carbon fibers are more likely to be insufficiently formed in the electrode mixture layer, and the resistance value in the film thickness direction of the electrode mixture layer may be insufficiently lowered in some cases. The upper limit of the average aspect ratio is 10000, preferably 1000 or less, and more preferably 800 or less.

In the present carbon fiber aggregate, the compression recovery degree represented by the following formula (2) is preferably 50% or more and 90% or less.

Compression Recovery Degree (%)=Volume Resistivity at Recovery/Volume Resistivity at Compression×100     Formula (2)

The compression recovery degree (%) specifically refers to the proportion (%) of the amount of change in volume resistivity in the case of lowering pressure from 1.0 MPa to 0.1 MPa to the amount of change in volume resistivity in the case of applying pressure from 0.1 MPa to 1.0 MPa to the carbon fiber aggregate.

When the compression recovery degree falls within this range, the carbon fibers are less likely to be broken, and the conductive paths formed in the electrode mixture layer during volume expansion after the charge/discharge cycle of a secondary battery are thus sufficiently maintained. As a result, a nonaqueous electrolyte secondary battery can be provided which has cycle characteristics improved. The lower limit of the compression recovery rate is more preferably 53%, further preferably 56%, and particularly preferably 58%. The upper limit of the compression recovery rate is more preferably 87%, further preferably 84%, and particularly preferably 78%.

The carbon fibers constituting the present carbon fiber aggregate are preferably not substantially branched. In this regard, the phrase of "not substantially branched" means that the branching degree is 0.01 pieces/μm or less. Branching refers to a granular part where a carbon fiber is, at a site other than the terminal part, bonded to another carbon fiber, the main axis of the carbon fiber is branched in the middle, and the main axis of the carbon fiber has a branched minor axis.

It is to be noted that the carbon fiber may have a fibrous form as a whole, which includes, for example, fibers with aspect ratios lower than the above-mentioned preferred range in contact with each other or bonded together to have a fiber shape in an integrated form (for example, continuous spherical carbon in a beaded shape, at least one or more extremely short fibers connected by fusion bonding or the like).

In this regard, the branching degree in the present invention means a value measured from a photograph taken at 5,000-fold magnification with a field emission scanning electron microscope.

In the carbon fibers constituting the present carbon fiber aggregate, the content ratio of metal elements is preferably 50 ppm or less, and more preferably 20 ppm or less in total. When the metal content ratio exceeds 50 ppm, the catalytic action of the metal makes the battery more likely to be deteriorated. In the present invention, the content ratio of the metal elements means the total content ratio of Li, Na, Ti, Mn, Fe, Ni and Co. In particular, the content ratio of Fe is preferably 5 ppm or less, more preferably 3 ppm or less, and further preferably 1 ppm or less. When the content ratio of Fe exceeds 5 ppm, the battery is particularly made more likely to be deteriorated, which is not preferable.

In the carbon fibers constituting the present carbon fiber aggregate, hydrogen, nitrogen, and ash in the fibers are all preferably 0.5% by mass or less, and more preferably 0.3% by mass or less. When hydrogen, nitrogen, and ash in the carbon fibers are all 0.5% by mass or lower, the graphite layer is further kept from having structural defects, thereby making it possible to inhibit side reactions in the battery, which is preferable.

1-2. Method for Producing Carbon Fiber Aggregate

The method for producing the present carbon fiber aggregate is not particularly limited, but the carbon fiber aggregate can be produced, for example, through the following steps (1) to (4):

(1) a step of forming a resin composition composed of 100 parts by mass of a thermoplastic resin and 1 to 150 parts by mass of a carbon precursor in a molten state, thereby fiberizing the carbon precursor to obtain a resin composite fiber;

(2) a stabilizing step of stabilizing the resin composite fiber to obtain a resin composite stabilized fiber;

(3) a thermoplastic resin removing step of removing the thermoplastic resin from the resin composite stabilized fiber to separate only the stabilized fiber; and (4) a firing step of heating the stabilized fiber to 1,000° C. or higher and lower than 2400° C. under an inert atmosphere to obtain a carbon fiber.

<Thermoplastic Resin>

The thermoplastic resin for use in the present invention needs to be easily removed after producing the resin composite fiber. Examples of such a thermoplastic resin include polyolefin, polyacrylate polymers such as polymethacrylate and polymethyl methacrylate, polystyrene, polycarbonate, polyarylate, polyester, polyamide, polyester carbonate, polysulfone, polyimide, polyetherimide, polyketone, and polylactic acid. Among the foregoing resins, the polyolefin is preferably used.

Specific examples of the polyolefin include polyethylene, polypropylene, poly-4-methylpentene-1, and copolymers containing the foregoing examples. From the viewpoint of easy removal in the thermoplastic resin removing step, polyethylene is preferably used. Examples of the polyethylene include homopolymers such as low-density polyethylenes, e.g., high-pressure low-density polyethylene and gas-phase/solution/high-pressure linear low-density polyethylene, medium-density polyethylene, and high-density polyethylene; copolymers of ethylene and α-olefin; and copolymers of ethylene and other vinyl monomers, such as ethylene-vinyl acetate copolymers.

In the case of the thermoplastic resin for use in the present invention, the melt mass flow rate (MFR) measured in accordance with JIS K 7210 (1999) is preferably 0.1 to 10 g/10 min, more preferably 0.1 to 5 g/10 min, and particularly preferably 0.1 to 3 g/10 min. When the MFR falls within the range mentioned above, a carbon precursor can be micro-dispersed in the thermoplastic resin in a favorable manner. In addition, in the formation of the resin composite fiber, the fiber diameters of carbon fibers obtained can be made smaller by stretching the fibers. The thermoplastic resin for use in the present invention preferably has, from the viewpoint of being able to melt and knead the thermoplastic resin easily with the carbon precursor, a glass transition temperature of 250° C. or lower in the case of being amorphous, and a melting point of 300° C. or lower in the case of being crystalline.

<Carbon Precursor>

It is preferable to use mesophase pitch as the carbon precursor. A case of using mesophase pitch as the carbon precursor will be described below. The mesophase pitch is a pitch that can form an optically anisotropic phase (liquid crystal phase) in a molten state. Examples of the mesophase pitch for use in the present invention include those obtained with distillation residue of coal or petroleum as a raw material, and those obtained with aromatic hydrocarbon such as naphthalene as a raw material. For example, mesophase pitch derived from coal is obtained by a treatment mainly including a hydrogenation/heat treatment of coal tar pitch, a treatment mainly including a hydrogenation/heat treatment/solvent extraction thereof, or the like.

More specifically, the mesophase pitch can be obtained by the following method.

First, hydrogenated coal tar pitch is obtained by hydrogenating a coal tar pitch with a softening point of 80° C., from which quinoline insoluble matter has been removed, in the presence of a Ni—Mo based catalyst at a pressure of 13 MPa and a temperature of 340° C. This hydrogenated coal tar pitch is heat-treated at 480° C. under atmospheric pressure, and then depressurized to remove low boiling point matter, thereby providing a crude mesophase pitch. This crude mesophase pitch is subjected to filtering at a temperature of 340° C. with the use of a filter to remove foreign matter, thereby allowing a purified mesophase pitch to be obtained.

The optical anisotropy content (mesophase ratio) of the mesophase pitch is preferably 80% or higher, and more preferably 90% or higher.

In addition, the mesophase pitch preferably has a softening point of 100 to 400° C., and more preferably 150 to 350° C.

<Resin Composition>

The resin composition (hereinafter, also referred to as a mesophase pitch composition) including a thermoplastic resin and a mesophase pitch, for use in the present invention, includes 100 parts by mass of the thermoplastic resin and 1 to 150 parts by mass of the mesophase pitch. The content of the mesophase pitch is preferably 5 to 100 parts by mass. If the content of the mesophase pitch exceeds 150 parts by mass, problems will be caused, such as the fact that resin composite fibers with a desired dispersion diameter fail to be obtained, whereas if the content is less than 1 part by mass, problems will be caused, such as the fact that the intended carbon fiber aggregate fails to be produced inexpensively, which is not preferable.

In order to produce a carbon fiber of less than 900 nm in fiber diameter, the dispersion diameter of the mesophase pitch in the thermoplastic resin is preferably 0.01 to 50 μm, and more preferably 0.01 to 30 μm. If the dispersion diameter of the mesophase pitch in the thermoplastic resin departs from the range of 0.01 to 50 μm, it may be difficult to produce a desired carbon fiber aggregate. It is to be noted that while the mesophase pitch forms a spherical or elliptical island phase in the mesophase pitch composition, the dispersion diameter in the present invention means, when the island component has a spherical shape, the diameter of the spherical shape, or means, when the island component has an elliptical shape, the major axis diameter of the elliptical shape.

The above-mentioned dispersion diameter of 0.01 to 50 μm is preferably maintained after keeping the mesophase pitch composition at 300° C. for 3 minutes, more preferably maintained after keeping the composition at 300° C. for 5 minutes, and particularly preferably maintained after keeping the composition at 300° C. for 10 minutes. In general, when the mesophase pitch composition is kept in a molten state, the mesophase pitch aggregates with time in the thermoplastic resin. If the mesophase pitch aggregates and causes its dispersion diameter to exceed 50 μm, it may be difficult to produce a desired carbon fiber aggregate. The aggregation rate of the mesophase pitch in the thermoplastic resin varies depending on the types of the thermoplastic resin and mesophase pitch used.

The mesophase pitch composition can be produced by kneading the thermoplastic resin and the mesophase pitch in a molten state. The thermoplastic resin and the mesophase pitch can be melted and kneaded with the use of a known apparatus. For example, one or more selected from the group consisting of a single-screw kneader, a twin-screw kneader, a mixing roll, and a Banbury mixer can be used. Among the foregoing examples, for the purpose of favorably micro-dispersing the mesophase pitch in the thermoplastic resin, it is preferable to use a twin-screw kneader, and in particular, it is preferable to use a twin-screw kneader in which respective axes rotate in the same direction.

The kneading temperature is not particularly restricted as long as the thermoplastic resin and the mesophase pitch are kept in a molten state, but preferably 100 to 400° C., and preferably 150 to 350° C. If the kneading temperature is lower than 100° C. the mesophase pitch will not be brought into a molten state, and will be difficult to micro-disperse in the thermoplastic resin, which is not preferable. On the other hand, when the temperature exceeds 400° C., decomposition of the thermoplastic resin and the mesophase pitch proceeds, which is not preferable. In addition, the melting-kneading time is preferably 0.5 to 20 minutes, and more preferably 1 to 15 minutes. When the melting-kneading time is shorter than 0.5 minutes, it is difficult to micro-disperse the mesophase pitch, which is not preferable. On the other hand, when the time exceeds 20 minutes, the productivity of the carbon fiber aggregate is significantly decreased, which is not preferable.

The melting-kneading is preferably carried out under an inert atmosphere with an oxygen gas content of lower than 10% by volume, more preferably under an inert atmosphere with an oxygen gas content of lower than 5% by volume, and particularly preferably under an inert atmosphere with an oxygen gas content of lower than 1%. The mesophase pitch for use in the present invention, which is modified by reacting with oxygen during the melting-kneading, may interfere with micro-dispersion into the thermoplastic resin in some cases. For this reason, the melting-kneading is preferably carried out under an inert atmosphere, thereby inhibiting the reaction between oxygen and the mesophase pitch.

<Resin Composite Fiber>

The method for producing the resin composite fiber from the mesophase pitch composition mentioned above is not limited as long as a desired carbon fiber aggregate can be produced, but examples of the method can include a method of melt-spinning the mesophase pitch composition through a spinneret, and a method of melting the mesophase pitch composition and forming a film thereof through a rectangular spinneret.

In order to obtain the present carbon fiber aggregate, it is preferable to go through the operation of increasing the initial orientation of the mesophase pitch included in the resin composite fiber at the stage of obtaining the resin composite fiber. The operation of increasing the initial orientation of the mesophase pitch included in the resin composite fiber requires the application of a deformation for increasing the orientation of the mesophase pitch in a molten state, and examples of such a method can include a method of applying shear strain to the mesophase pitch in a molten state, and a method of applying elongation strain.

As a method of applying shear strain, with the mesophase pitch melted, increasing the linear velocity of the mesophase pitch composition in the molten state with the use of a spinneret can apply shear strain when the mesophase pitch composition in the molten state passes through the flow path of the spinneret.

In addition, examples of the method of applying elongation strain include a method of, with the mesophase pitch melted, increasing the linear velocity of the mesophase pitch composition in the molten state toward the discharge side with the use of a spinneret. Specifically, the examples include a method of gradually reducing the cross-sectional area in the flow path toward the discharge side, and a method of taking up the mesophase pitch composition discharged from a spinneret at a linear velocity higher than the discharge linear velocity.

The temperature of going through the operation of increasing the initial orientation of the mesophase pitch needs to be higher than the melting temperature of the mesophase pitch, and is preferably 150 to 400° C., and more preferably 180 to 350° C. When the temperature exceeds 400° C., the deformation relaxation rate of the mesophase pitch is increased, thereby making it difficult to maintain the fiber morphology.

In addition, the step of producing the resin composite fiber may have a cooling step. Examples of the cooling step include, for example, in the case of melt spinning, a method of cooling the atmosphere downstream of the spinneret. In the case of melt film formation, examples of the cooling step include a method of providing a cooling drum downstream of the rectangular spinneret. Providing the cooling step can adjust the region where the mesophase pitch undergoes elongation deformation, and adjust the strain rate. In addition, providing the cooling step allows the resin composite fiber subjected to spinning or film formation to be immediately cooled and solidified for stable molding.

<Resin Composite Stabilized Fiber>

From the resin composite fiber obtained in the way mentioned above, a resin composite stabilized fiber is prepared by stabilizing (also referred to as infusibilization) the mesophase pitch fiber included in the resin composite fiber. The stabilization can be carried out by a known method such as a gas flow treatment with the use of air, oxygen, ozone, nitrogen dioxide, halogen, or the like, a solution treatment with the use of an acidic aqueous solution or the like, but infusibilization by a gas flow treatment is preferred from the aspect of productivity.

The gas component used is preferably air, oxygen, or a mixed gas containing air or oxygen from the viewpoint of handling ability, and it is particularly preferable to use air in terms of cost. The oxygen gas concentration used preferably falls within the range of 10 to 100% by volume of the entire gas composition. If the oxygen gas concentration is lower than 10% by volume of the entire gas composition, it takes a great deal of time to stabilize the mesophase pitch included in the resin composite fiber, which is not preferable.

The reaction temperature for the stabilization is preferably 50 to 350° C., more preferably 60 to 300° C., further preferably 100 to 300° C., and particularly preferably 200 to 300° C. The treatment time for the stabilization is preferably 10 to 1200 minutes, more preferably 10 to 600 minutes, further preferably 30 to 300 minutes, and particularly preferably 60 to 210 minutes.

While the softening point of the mesophase pitch is remarkably increased by the stabilization treatment, the softening point of the mesophase pitch is preferably 400° C. or higher, and further preferably 500° C. or higher, for the purpose of obtaining a desired carbon fiber aggregate.

<Thermoplastic Resin Removing Step>

Next, for the resin composite stabilized fiber obtained in the way described above, the thermoplastic resin included therein is removed, thereby separating the stabilized fiber. In this step, thermoplastic resin is decomposed and removed while inhibiting thermal decomposition of the stabilized fiber. Examples of a method for decomposing and removing the thermoplastic resin include, for example, a method of removing the thermoplastic resin with the use of a solvent, and a method of removing the thermoplastic resin by thermal decomposition.

The thermal decomposition of the thermoplastic resin is preferably carried out under an inert gas atmosphere. The inert gas atmosphere herein refers to a gas atmosphere such as carbon dioxide, nitrogen, or argon, and the oxygen concentration thereof is preferably 30 ppm by volume or less, and more preferably 20 ppm by volume or less. As the inert gas for use in the present step, it is preferable to use carbon dioxide and nitrogen in terms of cost, and it is particularly preferable to use nitrogen.

In the case of removing the thermoplastic resin by thermal decomposition, the removal can be also carried out under reduced pressure. The thermal decomposition under reduced pressure can sufficient remove the thermoplastic resin. As a result, the fusion can be reduced between fibers of the carbon fiber or graphitized fiber obtained by heating and then firing the stabilized fiber. The atmospheric pressure is preferably as low as possible, but preferably 50 kPa or lower, more preferably 30 kPa or lower, further preferably 10 kPa or lower, and particularly preferably 5 kPa or lower. On the other hand, since it is difficult to achieve a complete vacuum, the lower limit of the pressure is typically 0.01 kPa or higher.

In the case of removing the thermoplastic resin by thermal decomposition, slight amounts of oxygen and an inert gas may be present as long as the atmospheric pressure mentioned above is kept. In particular, the presence of a slight amount of inert gas is preferred, because the presence has the advantage of suppressing the fusion between fibers due to thermal degradation of the thermoplastic resin. It is to be noted that the term "under an atmosphere with a slight amount of oxygen" herein means that the oxygen concentration is 30 ppm by volume or less, and the term "under an atmosphere with a slight amount of inert gas" means that the inert gas concentration is 20 ppm by volume or less. The type of the inert gas used is as described above.

The temperature of the thermal decomposition is preferably 350 to 600° C., and more preferably 380 to 550° C. When the thermal decomposition temperature is lower than 350° C., thermal decomposition of the stabilized fiber is inhibited, but thermal decomposition of the thermoplastic resin can be achieved insufficiently in some cases. On the other hand, when the temperature exceeds 600° C., thermal decomposition of the thermoplastic resin can be achieved sufficiently, but even the stabilized fiber may be thermally decomposed in some cases, and as a result, the yield in the case of carbonization is likely to be decreased. The thermal decomposition time is preferably 0.1 to 10 hours, and more preferably 0.5 to 10 hours.

In the production method according to the present invention, the stabilizing step and the thermoplastic resin removing step are preferably carried out with the resin composite fiber or resin composite stabilized fiber of 2000 g/m$^2$ or less in basis weight held on a supporting base material. Holding on the supporting base material can inhibit the aggregation of the resin composite fiber or resin composite stabilized fiber due to the heat treatment during the stabilization treatment or the thermoplastic resin removal, thereby making it possible to maintain air permeability.

The material of the supporting base material is required not to cause any deformation or corrosion due to a solvent or heating. In addition, as for the heatproof temperature of the supporting base material, the material preferably has heat resistance at 600° C. or higher, since the material is required not to be deformed at the thermal decomposition temperature in the thermoplastic resin removing step mentioned above. Examples of such a material can include metallic materials such as stainless steel, and ceramic materials such as alumina or silica.

In addition, the shape of the supporting base material is preferably a shape that has air permeability in a direction perpendicular to the surface. A mesh structure is preferred as such a shape. The opening of the mesh is preferably 0.1 to 5 mm. When the mesh opening is larger than 5 mm, the heat treatment may possibly make fibers more likely to aggregate on lines of the mesh, thereby making the stabilization of the mesophase pitch or the removal of the thermoplastic resin insufficient in some cases, which is not preferable. On the other hand, when the opening of the mesh is smaller than 0.1 mm, the air permeability in a direction perpendicular to the surface of the supporting base material may be possibly decreased by the decreased porosity of the supporting base material in some cases, which is not preferable.

<Firing Step>

The present carbon fiber aggregate is obtained by heating and then firing the stabilized fiber mentioned above in an inert gas atmosphere. As a container for use in such a case, a crucible-shaped container made of graphite is preferred. In this regard, the heating temperature is 1000° C. or higher and lower than 2400° C. When the heating temperature is adjusted to fall within this range, the high percentage of carbon fibers which are excellent in crystallinity and large in effective fiber length is capable of imparting high conductivity. The lower limit of the heating temperature preferably in excess of 1000° C., is more preferably 1200° C. higher, further preferably 1300° C. or higher, even more preferably 1400° C. or higher, and particularly preferably 1500° C. or higher. When the lower limit is 1000° C. or lower, carbonization is more likely to be insufficient. In addition, the upper limit, value is lower than 2400° C., preferably 2300° C. or lower, more preferably 2200° C. or lower, further preferably 2100° C. or lower, even more preferably 2000° C. or lower, and particularly preferably 1900° C. or lower. When upper limit is 2400° C. or higher, crystallization proceeds excessively, and carbon fibers are likely to be broken.

The carbon fibers according to the present invention, produced in the foregoing temperature range, proceed with change in structure from carbon to graphite, in the process of graphitization. In other words, the carbon fibers have a carbonized structure with an insufficient graphitized structure, which is a unique structure (semi-graphite) with carbonaceous matter and graphitic matter. The carbon fiber aggregate according to the present invention, which has such a structure, has a crystallite spacing (d002) in a specific range, and has moderate hardness (pliability) without exhibiting brittleness of graphite, and thus has excellent workability and durability, and a large effective fiber length maintained. Therefore, when the present carbon fiber aggregate is used as a conducting aid in the electrode mixture layer, the conducting aid has an effective fiber length which is extremely efficient for the formation of conductive paths, also has excellent workability and durability, and has an excellent balance of conductivity.

It is to be noted that JP 2009-108444 A discloses a method for producing carbon fibers, in which a pitch-based carbon fiber precursor is immersed in a saturated hydrocarbon solution such as decalin, and then subjected to firing at a temperature of 600 to 1500° C. In this method, since the pitch-based carbon fiber precursor is immersed in the saturated hydrocarbon solution such as decalin, and then heated to 600 to 1500° C., the carbon fibers have no graphite structure (paragraph 0031), with no graphite structure developed, and thus structurally differ from the present carbon fiber aggregate. It is to be noted that in the present invention, the pitch-based carbon fiber precursor is not immersed in a saturated hydrocarbon solution such as decalin.

Examples of the inert gas used for heating and then firing the stabilized fiber include nitrogen and argon. The oxygen concentration in the inert gas is preferably 20 ppm by volume or less, and more preferably 10 ppm by volume or less. The firing time is preferably 0.1 to 24 hours, and more preferably 0.2 to 10 hours.

<Surface Oxidation Treatment Step>

The obtained carbon fiber aggregate may be subjected to a surface oxidation treatment. Examples of a method for the surface oxidation treatment include a method of heating together with an oxidizing gas, and a method of immersing in a liquid including an oxidizing substance. Examples of a simple method therefor include a method of heating to 300 to 800° C. in the air. In such a case, the heating time is typically 30 to 60 minutes.

<Grinding Treatment>

The method for producing the carbon fiber aggregate according to the present invention may include a grinding treatment step. The grinding treatment is preferably carried out in the thermoplastic resin removing step and/or the firing step. As a grinding method, it is preferable to apply a fine grinding mill such as a jet mill, a ball mill, a bead mill, an impeller mill, or a cutter mill, and after the grinding, classification may be carried out, if necessary. In the case of wet grinding, the dispersion medium is removed after the grinding, but in this regard, if secondary aggregation is caused significantly, subsequent handling will be extremely difficult. In such a case, it is preferable to carry out, after drying, a crushing operation with the use of a ball mill, a jet mill, or the like.

The appropriate adjustment of the grinding treatment can achieve a carbon fiber aggregate in which the variation coefficient of the effective fiber length falls within the range specified by the present invention. In addition, besides the method mentioned above, a carbon fiber aggregate in which the variation coefficient of the effective fiber length falls within the range specified by the present invention can be also produced by mixing two or more types of carbon fiber aggregates that differ in average effective length. For example, the carbon fiber aggregate can be manufactured with the use of a kit composed of a carbon fiber aggregate with an average effective fiber length of 1 to 10 μm and a carbon fiber aggregate with an average effective fiber length of 15 to 100 μm.

2. Electrode Mixture Layer for Nonaqueous Secondary Battery

The second aspect of the present invention is an electrode mixture layer for a nonaqueous electrolyte secondary battery (hereinafter also simply referred to as an "electrode mixture layer"), which uses the carbon fiber aggregate mentioned above. The electrode mixture layer contains an electrode active material, the carbon fiber aggregate according to the present invention as mentioned above, and preferably, a binder. The electrode mixture layer according to the present invention may further contain another carbon-based conducting aid.

The thickness (film thickness) of the electrode mixture layer according to the present invention is not particularly restricted, but is preferably 50 μm or more, more preferably 70 μm or more, further preferably 80 μm or more, and particularly preferably 100 μm or more. The upper limit of the film thickness is not particularly restricted, but typically less than 1000 μm, and particularly preferably less than 800 μm. When the film thickness is less than 50 μm, in the case of trying to manufacture an arbitrary capacity cell, separators and current collectors will be used in large numbers, thereby decreasing the volumetric occupancy of an active material layer in the cell. This is not favorable from the viewpoint of energy density, and the application is considerably restricted. When the film thickness is 1000 μm or more, cracks are likely to be generated in the electrode mixture layer, and the production is relatively difficult. In addition, when the film thickness 1000 μm or more, the transport of Li ions is likely to be blocked, and the resistance is likely to be increased. The method for measuring the film thickness of the electrode mixture layer is not particularly limited, but can be measured with the use of, for example, a micrometer.

Examples of a nonaqueous electrolyte secondary battery that is manufactured with the use of the electrode mixture layer according to the present invention include a lithium ion secondary battery as a typical battery. A positive electrode active material and a negative electrode active material for use in a lithium ion secondary battery will be described below.

<Positive Electrode Active Material>

As the positive electrode active material included in the electrode mixture layer according to the present invention, any one or two or more can be appropriately selected and used from conventionally known materials known as positive electrode active materials in nonaqueous electrolyte secondary batteries. For example, in the case of a lithium ion secondary battery, a lithium-containing metal oxide capable of occluding and releasing lithium ions is preferred. Examples of the lithium-containing metal oxide can include a composite oxide containing lithium and at least one element selected from the group consisting of Co, Mg, Mn, Ni, Fe, Al, Mo, V, W, Ti, and the like.

Specifically, the examples include at least one selected from the group consisting of $Li_xCoO_2$, $Li_xNiO_2$, $Li_xMnO_2$, $Li_xCo_aNi_{1-a}O_2$, $Li_xCo_bV_{1-b}O_z$, $Li_xCo_bFe_{1-b}O_2$, $Li_xMn_2O_4$, $Li_xMn_cCo_{2-c}O_4$, $Li_xMn_cNi_{2-c}O_4$, $Li_xMn_cV_{2-c}O_4$, $Li_xMn_cFe_{2-c}O_4$ (where x=0.02 to 1.2, a=0.1 to 0.9, b=0.8 to 0.98, c=1.2 to 1.96, and z=2.01 to 2.3), and the like. Preferred lithium-containing metal oxides can include at least one selected from the group consisting of $Li_xCoO_2$, $Li_xNiO_2$, $Li_xMnO_2$, $Li_xCo_aNi_{1-a}O_2$, $Li_xMn_2O_4$, and $Li_xCo_bV_{1-b}O_z$ (where x, a, b, and z are specified in the same manner as mentioned above). It is to be noted that the value of x is a value before the start of charging/discharge, which is increased or decreased by charge/discharge.

One of the positive electrode active materials mentioned above may be used alone, or two or more thereof may be used in combination. In addition, the average particle size of the positive electrode active material is preferably 10 μm or less, more preferably 0.05 to 7 μm, and further preferably 1 to 7 μm. When the average particle size exceeds 10 μm, the efficiency of charge/discharge reaction under a large-current condition may be decreased in some cases.

The content of the positive electrode active material in the electrode mixture layer according to the present invention is preferably 60% by mass or more, more preferably 70 to 98.5% by mass, and further preferably 75 to 98.5% by mass. If the content is less than 60% by mass, it may be difficult in some cases to apply the layer to power supply applications which require a high energy density. If the content exceeds 98.5% by mass, the amount of the binder may be excessively small, thereby generating cracks in the electrode mixture layer, or peeling the electrode mixture layer from the current collector in some cases. Furthermore, the contents of the carbon fibers and the carbon-based conducting aid may be excessively small, thereby making the conductivity of the electrode mixture layer insufficient in some cases.

<Negative Electrode Active Material>

As the negative electrode active material included in the electrode mixture layer according to the present invention, any one or two or more can be appropriately selected and used from conventionally known materials known as negative electrode active materials in nonaqueous electrolyte secondary batteries. For example, any of a carbon material, Si, and Sn, or an alloy, an oxide, or the like containing at least one of the foregoing materials can be used as a material capable of occluding and releasing lithium ions. Among the foregoing materials, the carbon material is preferred from the viewpoints of cost and the like. Examples of the carbon material include natural graphite, artificial graphite produced by heat-treating petroleum-based or coal-based coke, hard carbon of carbonized resin, and mesophase pitch-based carbon materials.

In the case of using natural graphite or artificial graphite, from the viewpoint of increasing the battery capacity, the spacing d(002) between (002) planes of the graphite structure, obtained by powder X-ray diffraction, preferably falls within the range of 0.335 to 0.337 nm. Natural graphite refers to a graphitic material naturally produced as an ore. Natural graphite is classified into two types of: scaly graphite with a high degree of crystallinity and amorphous graphite with a low crystallinity, depending on the appearance and properties of the graphite. Scaly graphite is further classified into flake graphite which has a leaf-shaped appearance and vein graphite which has a massive form. Natural graphite to serve as a graphitic material has no particular restriction on the locality, properties, and type thereof. In addition, natural graphite, or particles produced with natural graphite as a raw material may be subjected to a heat treatment, and used.

Artificial graphite refers to graphite made by widely artificial techniques, and a graphitic material close to perfect crystals of graphite. Typical examples thereof include a material obtained with, as a raw material, tar or coke obtained from residues through dry distillation of coal or distillation of crude oil, through a firing step on the order of 500 to 1000° C. and a graphitization step at 2000° C. or higher. In addition, kish graphite obtained by redeposition of carbon from dissolved iron is also a kind of artificial graphite.

The use of an alloy containing at least one of Si and Sn in addition to the carbon material as the negative electrode active material is efficient in that the electric capacity can be reduced, as compared with a case of using each of Si and Sn as a single substance or a case of using an oxide for each of Si and Sn. Among the foregoing materials, the Si based alloys are preferred. The Si-based alloys include an alloy of at least one element selected from the group consisting of B, Mg, Ca, Ti, Fe, Co, Mo, Cr, V, W, Ni, Mn, Zn, Cu, and the like, with Si. Specifically, the alloys include at least one selected from the group consisting of $SiB_4$, $SiB_6$, $Mg_2Si$, $Ni_2Si$, $TiSi_2$, $MoSi_2$, $CoSi_2$, $NiSi_2$, $CaSi_2$, $CrSi_2$, $Cu_5Si$, $FeSi_2$, $MnSi_2$, $VSi_2$, $WSi_2$, $ZnSi_2$, and the like.

In the electrode mixture layer according to the present invention, as the negative electrode active material, one of the already mentioned materials may be used alone, or two or more thereof may be used in combination. In addition, the average particle size of the negative electrode active material is made 10 μm or less. When the average particle size exceeds 10 μm, the efficiency of the charge/discharge reaction under a large-current condition will be decreased. The average particle size is preferably made 0.1 to 10 μm, and more preferably 1 to 7 μm.

<Binder>

As a binder for use in the electrode mixture layer according to the present invention, any binder can be used, as long as the binder is capable of electrode formation, with sufficient electrochemical stability. It is preferable to use, as the binder, one or more selected from the group consisting of polyvinyl alcohol, polyacrylic acid, carboxymethyl cellulose, polytetrafluoroethylene (PTFE), polyvinylidene fluoride (PVDF), styrene butadiene rubber (SBR), crosslinked fluoroolefin copolymer, polyimide, polyamideimide, aramid, phenol resin, and the like, and in particular, polyvinylidene fluoride (PVDF) is preferred. The form for use as a binder is not particularly restricted, may be a solid form or a liquid form (for example, an emulsion), and can be appropriately selected in consideration of the method for manufacturing an electrode (in particular, dry kneading or wet kneading), the dissolution in an electrolytic solution, and the like.

The content of the binder in the electrode mixture layer according to the present invention is preferably 1 to 25% by mass, more preferably 3 to 15% by mass, and further preferably 5 to 10% by mass. When the content is less than 1% by mass, cracks may be generated in the electrode mixture layer, or the electrode mixture layer may be peeled off from the current collector. When the content exceeds 25% by mass, the amount of the active material in the electrode is reduced, and the energy density of the battery obtained is thus likely to be decreased.

(Carbon-Based Conducting Aid Other than Carbon Fiber Aggregate According to Present Invention)

The electrode mixture layer according to the present invention may also include a carbon-based conducting aid, besides the present carbon fiber aggregate. Examples of the carbon-based conducting aid other than the present carbon fiber aggregate include carbon black, acetylene black, carbon nanotube, VGCF, flake carbon, graphene, and graphite. These carbon-based conducting aids may be used alone, or two or more thereof may be used in combination.

The shape of the foregoing carbon-based conducting aid is not particularly limited, but is preferably particulate. The average particle size (primary particle size) of the carbon-based conducting aid is preferably 10 to 200 nm, and more preferably from 20 to 100 nm. The aspect ratios of the foregoing carbon-based conducting aids are 10 or less, preferably 1 to 5, and more preferably 1 to 3.

The content of the carbon-based conducting aid other than the carbon fibers in the electrode mixture layer according to the present invention is preferably 0.5 to 5% by mass, more preferably 0.5 to 4% by mass, and further preferably 1 to 3 mass % by mass.

3. Electrode for Nonaqueous Electrolyte Secondary Battery

The third aspect of the present invention is an electrode for a nonaqueous electrolyte secondary battery (hereinafter, also referred to simply as an "electrode") with the electrode mixture layer formed. This electrode has the electrode mixture layer according to the present invention, formed on the surface of a current collector.

The following two methods are common as a method for manufacturing the electrode including the electrode mixture layer according to the present invention. One of the methods is a method of mixing and kneading the electrode active material mentioned above, the carbon fiber aggregate mentioned above, and, if necessary, a binder and other components, forming the mixture into a film by extrusion molding, rolling and stretching the film, and putting the rolled and stretched film to current collector.

The other method is a method of preparing a slurry by mixing the electrode active material mentioned above, the carbon fibers mentioned above, a solvent, and if necessary, a binder and a solvent that dissolves the binder, and other components, applying this slurry to a current collector surface, removing the solvent, and then carrying out pressing.

In the case of the present invention, both of the method can be adopted, but the latter method is preferred, and the latter method will be thus described in detail below.

The solid content concentration (which refers to the proportion of the total mass of the components other than the solvent in the slurry mentioned above to the total mass of the slurry) in the slurry is preferably 1 to 30% by mass, and more preferably 3 to 25% by mass. When the solid content concentration exceeds 30% by mass, it may be difficult to prepare a homogeneous slurry in some cases. In addition, when the solid content concentration is less than 1% by mass, the viscosity of the slurry is insufficient, and the thickness of the electrode mixture layer laminated on the current collector may be non-uniform in some cases.

The solvent for use in the slurry is not particularly limited, but when a binder is used, it is necessary to include a solvent that dissolves the binder. Specifically, examples of the solvent can include one or more selected from the group consisting of N-methylpyrrolidone (NMP), dimethylacetamide (DMAc), dimethylformamide (DMF), dimethyl sulfoxide (DMSO), and the like, and in particular, NMP or DMAc is preferred.

If the thixotropy in the slurry is excessively strong in the manufacture of the electrode, it may be difficult to ensure fluidity suitable for coating. In such a case, a slurry preparation aid may be used. Examples of the slurry preparation aid can include one or more selected from the group consisting of polyvinylpyrrolidone, carboxymethyl cellulose, polyvinyl acetate, polyvinyl alcohol, and the like. In particular, it is preferable to use polyvinylpyrrolidone. The addition of the slurry preparation aid as mentioned above can ensure sufficient fluidity even with a small amount of solvent, and also remarkably improves the dispersibility of the carbon-based conducting aid. In addition, the generation of cracks after the solvent removal can also be suppressed. The addition amount of the slurry preparation aid is preferably 10% by mass or less, more preferably 0.5 to 10% by mass, and further preferably 0.5 to 8% by mass, with respect to the total of components other than the solvent in the slurry. If the addition amount of the slurry preparation aid exceeds 10% by mass, the slurry viscosity may be rapidly decreased adversely, and defective dispersion may make it difficult to prepare a preferred slurry in some cases. When the addition amount of the slurry preparation aid is less than 0.5% by mass, the effect of the slurry preparation aid is unlikely to be exerted.

The slurry mentioned above is applied to the surface of a current collector which will be described later. As a method for the application, an appropriate coating method such as a doctor blade can be adopted. After the application, the solvent is removed by carrying out a heat treatment at, for example, 60 to 100° C., and preferably 75 to 85° C., preferably for 60 to 180 minutes. Thereafter, the coated product after the solvent removal is pressed, thereby making it possible to manufacture the electrode according to the present invention. Preferred pressing conditions are 1 to 5 minutes under a pressure of 10 to 30 Pa.

As the current collector constituting the electrode, any conductive material can be used. For example, a metal material of aluminum, nickel, iron, stainless steel, titanium, or copper can be used. In particular, aluminum, stainless steel, or copper is preferred, and it is preferable to use aluminum or carbon-coated aluminum.

The thickness of the current collector is preferably 10 to 50 μm.

4. Nonaqueous Electrolyte Secondary Battery

The fourth aspect of the present invention is a nonaqueous electrolyte secondary battery configured to include the electrode according to the present invention.

The nonaqueous electrolyte secondary battery according to the present invention is configured with the use of the electrode according to the present invention for a positive electrode and/or a negative electrode, and a known separator and an electrolytic solution. Examples of the nonaqueous electrolyte secondary battery include a lithium ion secondary battery.

The nonaqueous electrolyte secondary battery according to the present invention is composed of a positive electrode with a positive electrode material layer formed on the surface of a current collector, an electrolyte layer including an electrolyte, and the electrode (negative electrode) according to the present invention, which are stacked such that the positive electrode material layer of the positive electrode and the negative electrode material layer of the negative electrode are opposed to each other, and the electrolyte layer is inserted between the positive electrode material layer and the negative electrode material layer. Alternatively, the battery is composed of the electrode (positive electrode) according to the present invention, an electrolyte layer including an electrolyte, and a negative electrode with a negative electrode material layer formed on the surface of a current collector, which are stacked such that the positive electrode material layer of the positive electrode and the negative electrode material layer of the negative electrode are opposed to each other, and the electrolyte layer is inserted between the positive electrode material layer and the negative electrode material layer. Alternatively, the battery is composed of the electrode (positive electrode) according to the present invention, an electrolyte layer including an electrolyte, and the electrode (negative electrode) according to the present invention, which are stacked such that the positive electrode material layer of the positive electrode and the negative electrode material layer of the negative electrode are opposed to each other, and the electrolyte layer is inserted between the positive electrode material layer and the negative electrode material layer.

The cell shape of the nonaqueous electrolyte secondary battery according to the present invention is not particularly limited, and can be achieved in any shape. Specifically, examples of the shape can include cell shapes such as a button type, a cylindrical type, and a square type. In addition, it is also preferable to provide an internal configuration that has multiple pairs of positive and negative electrodes and separators stacked, and in this case, it is possible to adopt a known stack lamination type, wound type, folded lamination type, or the like. Examples of an exterior material for the nonaqueous electrolyte secondary battery according to the present invention can include, for example, a metallic can and an aluminum laminate resin film. In the nonaqueous electrolyte secondary battery according to the present invention, the predetermined carbon fibers added to the electrode mixture layer have a linear structure, and have high conductivity, and conductive paths are thus likely to be formed, thereby making it possible to achieve excellent charge/discharge characteristics. Furthermore, the electrode strength is also improved.

<Electrolyte Layer>

As the electrolyte layer constituting the nonaqueous electrolyte secondary battery, a nonaqueous electrolytic solution is used in which an electrolyte such as a lithium salt is dissolved in a nonaqueous solvent.

The electric conductivity of the electrolytic solution for use in the nonaqueous electrolyte secondary battery according to the present invention at 25° C. is preferably $1 \times 10^{-2}$ S/cm or more.

In general, nonaqueous electrolytic solutions are characterized by being higher in withstanding voltage, and thus providing a higher energy density, as compared with aqueous electrolytic solutions. As the nonaqueous solvent, it is possible to use known nonaqueous solvents without any restriction, and the solvents include propylene carbonate, ethylene carbonate, diethyl carbonate, dimethyl carbonate, methylethyl carbonate, dimethoxyethane, γ-butyrolactone, γ-valerolactone, acetonitrile, nitromethane, methoxyacetonitrile, nitroethane, N,N-dimethylformamide, 3-methoxypropionitrile, N-methylpyrrolidone, N,N'-dimethylimidazolidinone, dimethyl sulfoxide, sulfolane, 3 methylsulfolane, and ethylmethyl carbonate. These nonaqueous solvents may be used alone, or two or more thereof may be used in combination. It is important for the solvent for use in the electrolytic solution to have an appropriate boiling point, melting point, viscosity, and relative permittivity, and among the solvents mentioned above, in particular, the solvents mainly containing propylene carbonate or γ-butyrolactone are preferably used.

Examples of the electrolyte for use in the nonaqueous electrolyte secondary battery according to the present invention include, for example, $LiClO_4$, $LiBF_4$, $LiPF_6$, $LiAlCl_4$, $LiSbF_6$, LiSCN, $LiCF_3SO_3$, $LiCF_3CO_2$, $LiAsF_6$, lower aliphatic lithium carboxylate, LiCl, LiBr, LiI, chloroborane lithium, borate salts, and imide salts. The borate salts include lithium bis(1,2-benzenediolate(2-)-O,O')borate, lithium bis(2,3-naphthalenediolate(2-)-O,O')borate, lithium bis(2,2'-biphenyldiolate(2-)-O,O')borate, and lithium bis(5-fluoro-2-oleate-1-benzenesulfonic acid-O,O')borate. The imide salts include lithium bistrifluoromethanesulfonate imide (($CF_3SO_2$)$_2$NLi), lithium trifluoromethanesulfonate nonafluorobutanesulfonate imide (LiN($CF_3SO_2$) ($C_4F_9SO_2$)), and lithium bispentafluoroethane sulfonate imide (($C_2F_5SO_2$)$_2$NLi). The concentration of the electrolyte is preferably 0.5 to 2 mol/L. As the electrolyte, one kind of the foregoing electrolytes may be used alone, or two or more thereof may be used in combination. Known additives may be added to the electrolyte for the purpose of improving the cycle stability, the charge/discharge efficiency, and the like.

As the electrolytic solution for use in the lithium ion secondary battery according to the present invention, it is possible to use an ionic liquid typified by an ethylmethylimidazolium salt also in a preferred manner, and in this case, it is not always necessary to dissolve the liquid in the previously mentioned nonaqueous solvent before use.

<Separator>

In the case of using the nonaqueous electrolytic solution as mentioned above, it is common to use a separator in order to prevent direct contact between the negative electrode active material layer and the electrode mixture layer according to the present invention. As the shape of the separator, a known shape such as a paper shape (film shape) or a porous film shape can be adopted in a preferred manner. As the material of the separator, one or more materials selected from the group consisting of, for example, cellulose, aromatic polyamide, aliphatic polyimide, polyolefin, Teflon (registered trademark), polyphenylene sulfide, and the like can be used in a preferred manner. Among the foregoing materials, cellulose paper and aromatic polyamide or aliphatic polyimide porous film are preferable from the viewpoints of heat resistance and reduction in film thickness. The separator preferably has a film thickness on the order of 20 to 100 μm from the viewpoint of preventing short circuits, but in accordance with the present invention, it is also possible to apply a separator on the order of 5 to 20 μm, which is sufficiently thin as compared with conventional separators. The use of a thinner separator reduces the internal resistance derived from the separator, thus improving the output, and also improving the energy density of the cell.

EXAMPLES

Hereinafter, the present invention will be described more specifically with reference to examples, but the present invention is not limited thereto in any way. Various types of measurements and analyses in the examples were made respectively in accordance with the following methods.

(1) Confirmation of Carbon Fiber Shape

Measurements were made with the use of a particle size distribution meter for image analysis (model IF-200 nano, manufactured by JASCO International Co., Ltd.). The average effective fiber length, average fiber length, and average fiber diameter of the carbon fiber aggregate are average values on a volumetric basis. In addition, the CV value was obtained from the average value and the standard deviation. Furthermore, the average aspect ratio was calculated from the average effective fiber length and the average fiber diameter. It is to be noted that for some examples, average values on a number basis are also shown together.

(2) X-ray Diffraction Measurement of Carbon Fiber

The X-ray diffraction measurement was made in accordance with the JIS R 7651 method with the use of RINT-2100 manufactured by Rigaku Corporation, thereby measuring lattice spacing (d002) and crystallite size (Lc002).

(3) Method for Measuring Powder Volume Resistivity

The powder volume resistivity was measured with the use of a four probe-type electrode unit under a load of 0.02 to 2.50 kN with the use of a powder resistance system (MCP-PD51) manufactured by Mitsubishi Chemical Analytech Co., Ltd. For the volume resistivity, the powder volume resistivity of a sample was determined with reference to the volume resistivity values at 0.8 $g/cm^3$ and 0.5 $g/cm^3$ in packing density from a relationship diagram of volume resistivity with change in packing density.

(4) Method for Measuring Compression Recovery Degree

The compression recovery degree was measured with the use of a four probe-type electrode unit under a load of 0.02 to 0.40 kN with the use of a powder resistance system (MCP-PD51) manufactured by Mitsubishi Chemical Analytech Co., Ltd. The compression recovery degree is calculated from the volume resistivity at the time of compressing the sample and the volume resistivity at the time of recovery through compression relaxation (Compression Recovery Degree (%)=Volume Resistivity at Recovery/Volume Resistivity at Compression×100). The volume resistivity at the time of compression was obtained by calculating the amounts of volume resistivity change at 0.1 MPa and 1.0 MPa from a relationship diagram of volume resistivity with change in pressure in the application of a load from 0.02 to 0.40 kN. The volume resistivity at the time of recovery was obtained by calculating the amounts of volume resistivity change at 0.1 MPa and 1.0 MPa from a relationship diagram of volume resistivity with change in pressure in the load release from 0.40 kN to 0.02 kN.

Example 1

As the thermoplastic resin, 90 parts by mass of high-density polyethylene (manufactured by Prime Polymer Co., Ltd., HI-ZEX 5000 SR; melt viscosity 14 Pa·s at 350° C., 600 $s^{-1}$), and as the mesophase pitch, 10 parts by mass of mesophase pitch AR-MPH (manufactured by Mitsubishi Gas Chemical Company) were melted and kneaded with a unidirectional twin screw extruder (TEM-26SS manufactured by Toshiba Machine Co., Ltd., barrel temperature 310° C. under a nitrogen stream) to prepare a mesophase pitch composition. In the mesophase pitch composition obtained under this condition, the mesophase pitch was dispersed with a dispersion diameter of 0.05 to 2 μm in the thermoplastic resin. In addition, this mesophase pitch composition was held at 300° C. for 10 minutes, but aggregation of the mesophase pitch was not observed, and the dispersion diameter was 0.05 to 2 μm.

Subsequently, from the mesophase pitch composition mentioned above, resin composite fibers (long fibers) were prepared through a spinneret of 0.2 mm in diameter with a melt spinning machine under the condition of a spinneret temperature of 390° C.

Next, short fibers of about 5 cm in length were prepared from the resin composite fibers (long fibers). The short fibers were arranged in the form of a nonwoven fabric on a wire mesh with an opening of 1.46 mm and a wire diameter of 0.35 mm, so as to provide a basis weight of 30 g/m².

The nonwoven fabric composed of the resin composite fibers was held in a hot-air dryer at 215° C. for 3 hours, thereby preparing a nonwoven fabric composed of resin composite stabilized fibers. Next, in a vacuum gas purging furnace, the thermoplastic resin was removed by pressure reduction down to 1 kPa after nitrogen purging, and heating from the state. The heating conditions were: raising the temperature up to 500° C. at a rate of temperature rise of 5° C./min, and then keeping the temperature for 60 minutes. The nonwoven fabric composed of the stabilized fibers was added to an ethanol solvent, and the stabilized fibers were dispersed in the solvent by applying vibrations for 30 minutes with an ultrasonic oscillator. The stabilized fibers dispersed in the solvent were filtered, thereby preparing a nonwoven fabric composed of stabilized fibers.

The nonwoven fabric composed of the stabilized fibers was heated up to 1000° C. at 5° C./min and subjected to a heat treatment at the temperature for 0.5 hours under a nitrogen gas flow in a vacuum gas purging furnace, and then cooled to room temperature. Next, this nonwoven fabric was placed in a graphite crucible, and heated at 10° C./min from room temperature to 1000° C. in a vacuum with the use of an ultrahigh-temperature furnace (SCC-U-80/150 type, manufactured by Kurata Giken Co., Ltd., soaking part: 80 mm (diameter)×150 mm (height)). After reaching 1000° C., an argon gas (99.999%) atmosphere at 0.05 MPa (gauge pressure) was created, and the temperature was then raised up to 1700° C. at a rate of temperature rise of 10° C./min, at which a heat treatment was carried out for 0.5 hours, thereby providing a carbon fiber aggregate.

Branching failed to be confirmed from the carbon fibers constituting the obtained carbon fiber aggregate. The results of measuring the crystallite spacing d002, the crystallite size Lc002, the average effective fiber length, the average fiber length, the average aspect ratio, and the two types of powder volume resistivity are listed in Table 1.

The carbon fiber aggregate obtained in Example 1 was an excellent carbon fiber aggregate with large d002, but with a high aspect ratio, a large effective fiber length, and high conductivity.

Slurry was prepared with the use of 1 part by mass of the carbon fiber aggregate (CNF) obtained in Example 1, 92 parts by mass of a positive electrode active material (P13F manufactured by TATUNG FINE CHEMICALS CO., LTD.), 7 parts by mass of polyvinylidene fluoride (W #7200 manufactured by Kureha Corporation) as a binder, and N-methylpyrrolidone as a solvent. The prepared slurry was applied to a current collector (aluminum foil of 15 μm in thickness), then dried at 120° C. for 3 h, and pressed to prepare an electrode. The thickness of the electrode mixture layer was 123 μm, and the density thereof was 2.32 g/cm³. The electrode resistance of the prepared electrode in the film thickness direction was measured with the use of a potentiostat/galvanostat (HA-151 manufactured by Hokuto Denko Corporation), and the electric conductivity calculated from the resistance value is shown in Table 1.

Slurry was prepared with the use of 2 parts by mass of the carbon fiber aggregate (CNF) obtained in Example 1, 91 parts by mass of a positive electrode active material (P13F manufactured by TATUNG FINE CHEMICALS CO., LTD.), 7 parts by mass of polyvinylidene fluoride (W #7200 manufactured by Kureha Corporation) as a binder, and N-methylpyrrolidone as a solvent. The prepared slurry was applied to a current collector (aluminum foil of 15 μm in thickness), then dried at 120° C. for 3 h, and pressed to prepare an electrode. The thickness of the electrode mixture layer was 120 μm, and the density thereof was 2.29 g/cm³. The electrode resistance of the prepared electrode in the film thickness direction was measured with the use of a potentiostat/galvanostat (HA-151 manufactured by Hokuto Denko Corporation), and the electric conductivity calculated from the resistance value is shown in Table 1.

Example 2

Under the same conditions as in Example 1 except that the final temperature at the time of heating was adjusted to 2000° C., a carbon fiber aggregate was prepared. Branching failed to be confirmed from the carbon fibers constituting the obtained carbon fiber aggregate. The results of measuring the crystallite spacing d002, the crystallite size Lc002, the average effective fiber length, the average fiber length, the average aspect ratio, and the two types of powder volume resistivity are listed in Table 1.

The carbon fiber aggregate obtained in Example 2 was, as in Example 1, an excellent carbon fiber aggregate with large d002, but with a high aspect ratio, a large effective fiber length, and high conductivity.

Example 3

Under the same conditions as in Example 1 except that the final temperature at the time of heating was adjusted to 1500° C., a carbon fiber aggregate was prepared. Branching failed to be confirmed from the carbon fibers constituting the obtained carbon fiber aggregate. The results of measuring the crystallite spacing d002, the crystallite size Lc002, the average effective fiber length, the average fiber length, the average aspect ratio, and the two types of powder volume resistivity are listed in Table 1.

The carbon fiber aggregate obtained in Example 3 was, as in Example 1, an excellent carbon fiber aggregate with large d002, but with a high aspect ratio, a large effective fiber length, and high conductivity.

Example 4

Under the same conditions as in Example 1 except that the final temperature at the time of heating was adjusted to 1300° C., a carbon fiber aggregate was prepared. Branching failed to be confirmed from the carbon fibers constituting the obtained carbon fiber aggregate. The results of measuring the crystallite spacing d002, the average effective fiber length, the average fiber length, the average aspect ratio, and the two types of powder volume resistivity are listed in Table 1. It is to be noted that for the obtained carbon fiber aggregate, the peak was very small at the diffraction angle corresponding to the crystallite size Lc002 in the X-ray diffraction pattern, and it was difficult to analyze the peak.

The carbon fiber aggregate obtained in Example 4 was, as in Example 1, an excellent carbon fiber aggregate with large d002, but with a high aspect ratio, a large effective fiber length, and high conductivity.

Comparative Example 1

Under the same conditions as in Example 1 except that the final temperature at the time of heating was adjusted to 2400° C., a carbon fiber aggregate was prepared. Branching failed to be confirmed from the carbon fibers constituting the obtained carbon fiber aggregate. The results of measuring the crystallite spacing d002, the crystallite size Lc002, the average effective fiber length, the average fiber length, the average aspect ratio, and the two types of powder volume resistivity are listed in Table 1.

The carbon fiber aggregate obtained in Comparative Example 1 was high in crystallinity and low in powder volume resistivity, but small in effective fiber length.

Comparative Example 2

Under the same conditions as in Example 1 except that the final temperature at the time of heating was adjusted to 3000° C., a carbon fiber aggregate was prepared. Branching failed to be confirmed from the carbon fibers constituting the obtained carbon fiber aggregate. The results of measuring the crystallite spacing d002, the crystallite size Lc002, the average effective fiber length, the average fiber length, the average aspect ratio, and the two types of powder volume resistivity are listed in Table 1.

The carbon fiber aggregate obtained in Comparative Example 2 was high in crystallinity and low in powder volume resistivity, but small in effective fiber length.

Comparative Example 3

Under the same conditions as in Example 1 except that the final temperature at the time of heating was adjusted to 1000° C., a carbon fiber aggregate was prepared. Branching failed to be confirmed from the carbon fibers constituting the obtained carbon fiber aggregate. The results of measuring the average effective fiber length, the average fiber length, the average aspect ratio, and the two types of powder volume resistivity are listed in Table 1. It is to be noted that it was difficult to analyze the obtained carbon fiber aggregate, because no peak was observed at the diffraction angle corresponding to the crystallite spacing d002 in the X-ray diffraction pattern. In addition, the peak was very small at the diffraction angle corresponding to the crystallite size Lc002, and it was difficult to analyze the peak.

The carbon fiber aggregate obtained in Comparative Example 3 was low in crystallinity and high in powder volume resistivity, but large in effective fiber length.

Reference Example 1

Under the same conditions as in Example 1 except that the final temperature at the time of heating was adjusted to 2000° C., and that grinding was carried out with the use of a jet mill (AO-JET manufactured by Seishin Enterprise Co., Ltd.) after firing, a carbon fiber aggregate was prepared. The crystallite spacing d002 of the obtained carbon fiber aggregate was 0.3427 nm, the average effective fiber length (number basis) thereof was 19 μm, the average aspect ratio thereof was 76, the powder volume resistivity thereof at the packing density of 0.8 g/cm$^3$ was 0.0411 Ω·cm, and the powder volume resistivity thereof at a packing density of 0.5 g/cm$^3$ was 0.1280 Ω·cm.

TABLE 1

| | Firing Temperature ° C. | Spacing and Size of Crystallite | | Powder Volume Resistivity | | Fiber Length *1 | | | | | Compression Recovery Degree % |
|---|---|---|---|---|---|---|---|---|---|---|---|
| | | d002 nm | Lc002 nm | 0.8 g/cm$^3$ Ω·cm | 0.5 g/cm$^3$ Ω·cm | Average Effective Fiber Length μm | Average Aspect Ratio — | CV Value of Effective Fiber Length % | Average Fiber Length μm | Average Effective Length/ Average Fiber Length — | |
| Example 1 | 1700 | 0.3430 | 8.7 | 0.0205 | 0.0602 | 81 (68) | 325 (272) | 80 (80) | 117 | 0.696 | 73 |
| Example 2 | 2000 | 0.3427 | 20.6 | 0.0288 | 0.0804 | 61 (51) | 242 (196) | 70 (70) | 82 | 0.735 | 66 |
| Example 3 | 1500 | 0.3441 | 5.4 | 0.0277 | 0.0677 | 90 | 359 | 83 | 136 | 0.657 | 59 |
| Example 4 | 1300 | 0.3449 | <5.0 | 0.0237 | 0.0800 | 104 | 416 | 72 | 153 | 0.680 | 57 |
| Comparative Example 1 | 2400 | 0.3395 | 34.1 | 0.0270 | 0.0650 | 29 (11) | 116 (44) | 54 (61) | 35 | 0.817 | 80 |
| Comparative Example 2 | 3000 | 0.3365 | 87.9 | 0.0183 | 0.0437 | 26 (11) | 106 (44) | 62 (56) | 33 | 0.813 | 89 |
| Comparative Example 3 | 1000 | Unanalyzable | <5.0 | 0.0285 | 0.0885 | 123 | 492 | 66 | 190 | 0.648 | 48 |

*1 values on a volumetric basis, however, the values in parentheses on a number basis.

TABLE 2

(Continuation of Table 1)

| | Electrode containing 1% by mass of CNF | | | Electrode containing 2% by mass of CNF | | | Electrode containing No CNF |
|---|---|---|---|---|---|---|---|
| | Electrode Conductivity mS/cm | Mixture Layer Film Thickness μm | Mixture Layer Density g/cm³ | Electrode Conductivity mS/cm | Mixture Layer Film Thickness μm | Mixture Layer Density g/cm³ | Mixture Layer Density mS/cm |
| Example 1 | 4.47 | 123 | 2.32 | 8.93 | 120 | 2.29 | 0.46 |
| Example 2 | 3.05 | 123 | 2.31 | 5.36 | 127 | 2.29 | |
| Example 3 | 4.41 | 123 | 2.32 | 8.32 | 119 | 2.24 | |
| Example 4 | 3.73 | 110 | 2.28 | 5.35 | 105 | 2.23 | |
| Comparative Example 1 | 2.09 | 120 | 2.35 | 3.22 | 123 | 2.35 | |
| Comparative Example 2 | 2.26 | 121 | 2.37 | 3.96 | 120 | 2.37 | |
| Comparative Example 3 | 2.51 | 107 | 2.26 | 2.65 | 122 | 2.08 | |

The carbon fiber aggregate according to the present invention is considerably long in average effective fiber length, and the powder volume resistivity at 0.8 g/cm³ and 0.5 g/cm³ in packing density is thus just slightly higher as compared with the case of Comparative Example 2 (final heating temperature of 3000° C.). This can be considered to achieve high conductivity because the fiber length is kept large, even if crystallinity of the carbon fiber is somewhat low.

Furthermore, the carbon fiber aggregate according to the present invention maintains a large effective fiber length even after the formation of an electrode, thus developing high electrode conductivity.

The invention claimed is:

1. A carbon fiber aggregate wherein the carbon fiber aggregate comprises a carbon fiber of 0.3400 nm or more in crystallite spacing (d002) in accordance with an X-ray diffraction method, and has an average fiber diameter of 10 to 900 nm, and a powder volume resistivity at a packing density of 0.8 g/cm³ is $4.00 \times 10^{-2}$ Ω·cm or less.

2. The carbon fiber aggregate according to claim 1, wherein the carbon fiber aggregate is 20μm or more in average effective fiber length.

3. The carbon fiber aggregate according to claim 1, wherein a variation coefficient of an effective fiber length is 35% or higher and 90% or lower.

4. The carbon fiber aggregate according to claim 1, wherein an average aspect ratio is 80 or more and 10000 or less.

5. The carbon fiber aggregate according to claim 1, wherein an average effective fiber length (A) and an average fiber length (B) satisfy the following formula (1):

$$0.500 < A/B < 0.900 \qquad \text{Mathematical Formula (1)}.$$

6. The carbon fiber aggregate according to claim 1, wherein a compression recovery degree represented by the following formula (2):

$$\text{Compression Recovery Degree (\%)} = \text{Volume Resistivity at Recovery/Volume Resistivity at Compression} \times 100 \qquad \text{Mathematical Formula (2)}$$

is 50% or higher and 90% or lower.

7. A method for producing the carbon fiber aggregate according to claim 1 the method comprising:
   (1) a fiberizing step of forming a composition composed of 100 parts by mass of a thermoplastic resin and 1 to 150 parts by mass of a mesophase pitch in a molten state, thereby fiberizing the mesophase pitch to obtain a resin composite fiber;
   (2) a stabilizing step of stabilizing the resin composite fiber to obtain a resin composite stabilized fiber;
   (3) a thermoplastic resin removing step of removing the thermoplastic resin from the resin composite stabilized fiber to obtain a stabilized fiber; and
   (4) a heating and firing step of heating the stabilized fiber at 1,000° C. or higher and lower than 2400° C. under an inert atmosphere to obtain a carbon fiber.

8. An electrode mixture layer for a nonaqueous electrolyte secondary battery, the electrode mixture layer comprising:
   the carbon fiber aggregate according to claim 1; and an electrode active material.

9. An electrode for a nonaqueous electrolyte secondary battery, the electrode comprising:
   a current collector; and
   the electrode mixture layer for a nonaqueous electrolyte secondary battery according to claim 8, stacked on the current collector.

10. A nonaqueous electrolyte secondary battery comprising the electrode mixture layer for a nonaqueous electrolyte secondary battery according to claim 8.

* * * * *